US010885626B2

(12) United States Patent
Tamai (10) Patent No.: US 10,885,626 B2
(45) Date of Patent: Jan. 5, 2021

(54) IDENTIFYING APPARATUS, IDENTIFYING METHOD, AND PROGRAM

(71) Applicant: OMRON Corporation, Kyoto (JP)

(72) Inventor: Toshinori Tamai, Nara (JP)

(73) Assignee: OMRON Corporation, Kyoto (JP)

( * ) Notice: Subject to any disclaimer, the term of this patent is extended or adjusted under 35 U.S.C. 154(b) by 80 days.

(21) Appl. No.: 16/162,451

(22) Filed: Oct. 17, 2018

(65) Prior Publication Data

US 2019/0188845 A1    Jun. 20, 2019

(30) Foreign Application Priority Data

Dec. 14, 2017   (JP) .................. 2017-239302

(51) Int. Cl.
| | | |
|---|---|---|
| G06T 7/00 | (2017.01) | |
| G06K 9/32 | (2006.01) | |
| G06K 9/62 | (2006.01) | |
| G06K 9/00 | (2006.01) | |
| G06K 9/46 | (2006.01) | |

(52) U.S. Cl.
CPC ........ G06T 7/0008 (2013.01); G06K 9/00624 (2013.01); G06K 9/3241 (2013.01); G06K 9/46 (2013.01); G06K 9/6227 (2013.01); G06T 7/0004 (2013.01); G06K 2209/19 (2013.01); G06T 2207/20081 (2013.01); G06T 2207/20084 (2013.01); G06T 2207/30164 (2013.01)

(58) Field of Classification Search
CPC .... G06K 9/46; G06K 9/3241; G06K 9/00624; G06K 9/6227; G06K 2209/19; G06T 7/0004; G06T 7/0008; G06T 2207/30164; G06T 2207/20081; G06T 2207/20084
See application file for complete search history.

(56) References Cited

U.S. PATENT DOCUMENTS

| | | | |
|---|---|---|---|
| 9,355,440 B1 | 5/2016 | Chen et al. | |
| 2011/0019245 A1* | 1/2011 | Adachi | .............. H04N 1/00002 358/448 |
| 2017/0069075 A1 | 3/2017 | Okuda | |

FOREIGN PATENT DOCUMENTS

JP     2017-49974 A    3/2017

OTHER PUBLICATIONS

The Summons to attend oral proceedings pursuant to Rule 115(1) EPC issued on Dec. 4, 2019 in a counterpart European patent application.

* cited by examiner

*Primary Examiner* — Brenda C Bernardi
(74) *Attorney, Agent, or Firm* — Metrolex IP Law Group, PLLC (57) ABSTRACT

An identifying apparatus may include: an imaging unit configured to store multiple identifiers that are trained to identify, from images of objects, the presence or absence of a detection target included in the objects, the identifiers being stored in association with attributes of the objects, and to capture an image of a predetermined object; a specifying unit configured to specify an attribute of the predetermined object; a selecting unit configured to select, from the multiple identifiers, a first identifier stored in association with the specified attribute; an input unit configured to input the image of the predetermined object to the first identifier; and an output unit configured to output the presence or absence of the detection target included in the predetermined object, which is output from the first identifier.

13 Claims, 11 Drawing Sheets

| DEFECT IDENTIFIER | ATTRIBUTE OF WORKPIECE | | TYPE OF DETECTABLE DEFECT |
|---|---|---|---|
| | MATERIAL | SURFACE FORM | |
| 1a | METAL | ROUGH | SCRATCH |
| 1b | | | CONTAMINATION |
| 1c | | | COLOR UNEVENNESS |
| ... | | | ... |
| 2a | | LOW REFLECTANCE | SCRATCH |
| 2b | | | CONTAMINATION |
| 2c | | | COLOR UNEVENNESS |
| ... | | | ... |
| ... | | GLOSSY | ... |
| ... | VINYL | TRANSPARENT | ... |
| ... | ... | ... | ... |

IDENTIFYING APPARATUS, IDENTIFYING METHOD, AND PROGRAM

CROSS-REFERENCES TO RELATED APPLICATIONS

This application claims priority to Japanese Patent Application No. 2017-239302 filed Dec. 14, 2017, the entire contents of which are incorporated herein by reference.

FIELD

The disclosure relates to an identifying apparatus, an identifying method, and a program.

BACKGROUND

It is known that, if an identifier used for identifying whether a detection target is included in image data is generated by machine learning, then there is generally a trade-off between identification accuracy and versatility with which various detection targets can be detected.

JP 2017-049974A discloses an inspection apparatus that selects feature amounts to identify whether or not objects are proper from the images of the objects, whose apparent quality is known, captured in at least two different image capturing conditions, and that has an identifier, generated based on the selected feature amounts, to identify whether or not the objects are proper.

JP 2017-049974A is an example of a background art.

SUMMARY

Considering that objects having various attributes pass down in factory production lines, an inspection apparatus for detecting a detection target included in an object is required to exhibit a high identification accuracy for these objects having various attributes. However, the inspection apparatus described in JP 2017-049974A aims to determine the apparent quality of an object to be inspected with high accuracy and in a short period of time, and it is not considered that the inspection apparatus should exhibit a high identification accuracy for the above-mentioned objects having various attributes.

Accordingly, an aspect may provide a technique for realizing high identification accuracy by selecting an identifier in accordance with an attribute of an object.

An identifying apparatus according to an aspect of this disclosure includes: a storage unit (such as a memory, read only memory, Hard Disk Drive, Solid State Drive, non-volatile memory such as random access memory, etc.) configured to store multiple identifiers that are trained to identify, from image of object, the presence or absence of a detection target included in the objects, the identifiers being stored in association with attributes of the objects; an imaging unit (such as a camera, etc.) configured to capture an image of a predetermined object; a processor (such as a central processing unit, field programmable gate array, digital signal processor, graphical processing unit, application specific integrated circuit, an integrated circuit, etc.) configured with a program to perform operations as units of the identifying apparatus, a specifying unit configured to specify an attribute of the predetermined object; a selecting unit configured to select, from the multiple identifiers, a first identifier that is stored in association with the specified attribute; an input unit configured to input the image of the predetermined object to the first identifier; and an output unit configured to output the presence or absence of the detection target included in the predetermined object, which is output from the first identifier.

According to an aspect, because the identifier corresponding to the attribute of the object from multiple identifiers, which are previously trained, included in the identifying apparatus is selected, high identification accuracy can be realized. Also, the identifying apparatus does not simultaneously execute the multiple identifiers, but operates the identifier selected for each object. Accordingly, it is possible to reduce the processing load and the memory usage amount of the identifying apparatus as compared with a case where the multiple identifiers are simultaneously executed.

In an aspect, the specifying unit may also specify the attribute of the predetermined object from the image of the predetermined object. Also, the specifying unit may also include a second identifier that is trained to specify, from an image of an object, an attribute of the object, and the second identifier may also specify the attribute of the predetermined object from the image of the predetermined object. According to an aspect, an attribute of an object is specified using an identifier generated through training, and thus high identification accuracy can be realized.

In an aspect, the specifying unit may also specify the attribute of the predetermined object in a preset order. According to an aspect, the identifying apparatus can recognize the attribute of the object in the preset order, and thus the processing load and the memory usage amount of the identifying apparatus can be reduced.

In an aspect, each of the multiple identifiers stored in the storage unit may also be trained to specify, for an object having an attribute associated with the identifier, the presence of absence of a detection target with higher accuracy than any other identifier. According to an aspect, each identifier exhibits high identification accuracy for an object having a specified attribute, and thus higher identification accuracy can be realized.

In an aspect, the object is an object to be inspected, and the detection target is a defect included in the object to be inspected. According to an aspect, an identifying apparatus for detecting a defect included in an object to be inspected can be realized.

An identifying method according to an aspect of this disclosure is an identifying method executed by an identifying apparatus including an storage unit, the storage unit being configured to store multiple identifiers that are trained to specify, from images of objects, the presence or absence of a detection target included in the objects, the identifiers being stored in association with attributes of the objects, the method includes: a step of capturing an image of a predetermined object; a step of specifying an attribute of the predetermined object; a step of selecting, from the multiple identifiers, a first identifier that is stored in association with the specified attribute; an step of inputting the image of the predetermined object to the first identifier; and a step of outputting the presence or absence of a detection target included in the predetermined object, which is output from the first identifier.

According to an aspect, because the identifier corresponding to the attribute of the object is selected from multiple identifiers, which are previously trained, included in the identifying apparatus, high identification accuracy can be realized. Also, the identifying apparatus does not simultaneously execute the multiple identifiers, but operates the identifier selected for each object. Accordingly, it is possible to reduce the processing load and the memory usage amount of the identifying apparatus as compared with a case where the multiple identifiers are simultaneously executed.

A program according to an aspect of this disclosure causes the identifying apparatus to function as: a storage part configured to store multiple identifiers that are trained to identify, from images of objects, the presence or absence of a detection target included in the objects, the identifiers being stored in association with attributes of the objects; a imaging part configured to capture an images of a predetermined object; a specifying part configured to specify the attribute of the predetermined object; a selecting part configured to select, from the multiple identifiers, a first identifier that is stored in association with the specified attribute; an input part configured to input the image of the predetermined object to the first identifier; and an output part configured to output the presence or absence of a detection target included in the predetermined object, which is output from the first identifier.

According to an aspect, because the identifier corresponding to the attribute of the object is selected from the multiple identifiers, which are previously trained, included in the identifying apparatus, high identification accuracy can be realized. Also, the identifying apparatus does not simultaneously execute the multiple identifiers, but operates the identifier selected for each object. Accordingly, it is possible to reduce the processing load and the memory usage amount of the identifying apparatus as compared with a case where the multiple identifiers are simultaneously executed.

With an aspect, a technique for realizing high identification accuracy by selecting an identifier according to an attribute of an object to be inspected can be provided.

DETAILED DESCRIPTION

Hereinafter, an embodiment according to an aspect (hereinafter, referred to as "an embodiment") will be described based on the drawings.

1. Application Example

Figure 1:
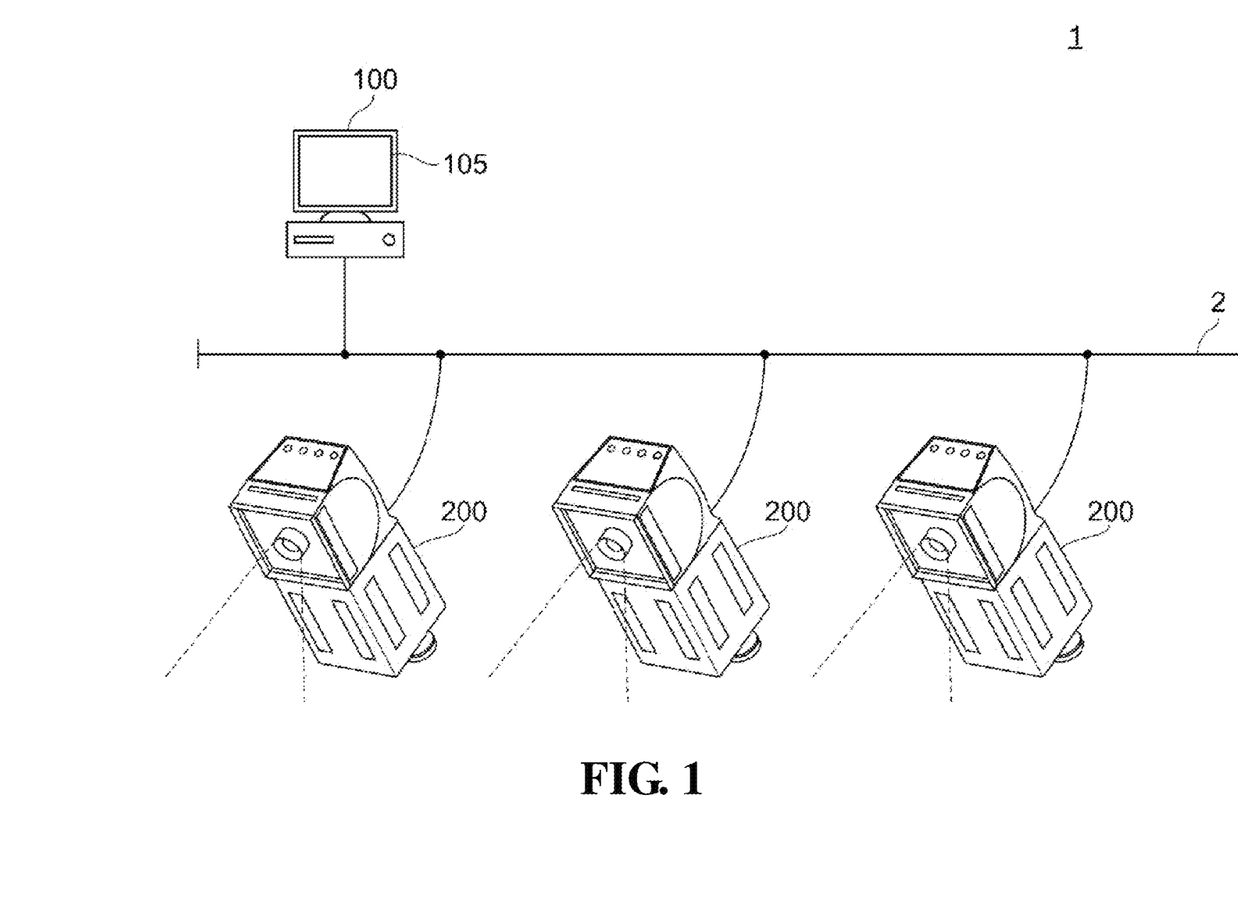
FIG. 1 is a diagram schematically illustrating an example of an application situation of an image processing system according to an embodiment.

First, an example of a situation to which an embodiment is applied will be described with reference to FIG. 1. FIG. 1 schematically shows an example of an application situation of an image processing system 1 according to an embodiment. The image processing system 1 is typically installed in production lines or the like. The image processing system 1 performs processing such as inspection of workpieces or recognition of text characters based on images obtained by capturing the workpieces that are being conveyed on production lines. Note, that "workpiece" refers to a component, a product or the like in manufacturing processes, and is an example of an "object" of an embodiment.

As shown in FIG. 1, the image processing system 1 includes a management apparatus 100, and one or more image processing apparatuses 200 configured to communicate with the management apparatus 100 via a network 2. A workpiece is conveyed, for example, in a predetermined direction by a conveyor mechanism such as a belt conveyor, and each of the image processing apparatuses 200 is arranged at a predetermined position with respect to the conveyor route. The image processing apparatus 200 is an example of an "identifying apparatus" of an embodiment. The management apparatus 100 is an apparatus for managing the one or more image processing apparatuses 200. The image processing apparatus 200 is an apparatus for identifying the presence or absence of a detection target included in a workpiece. In the following description, it is assumed that a detection target is a defect, but a defect is an example of a "detection target" of an embodiment. An embodiment can be applied to any detection target without being limited to defects.

Figure 2:
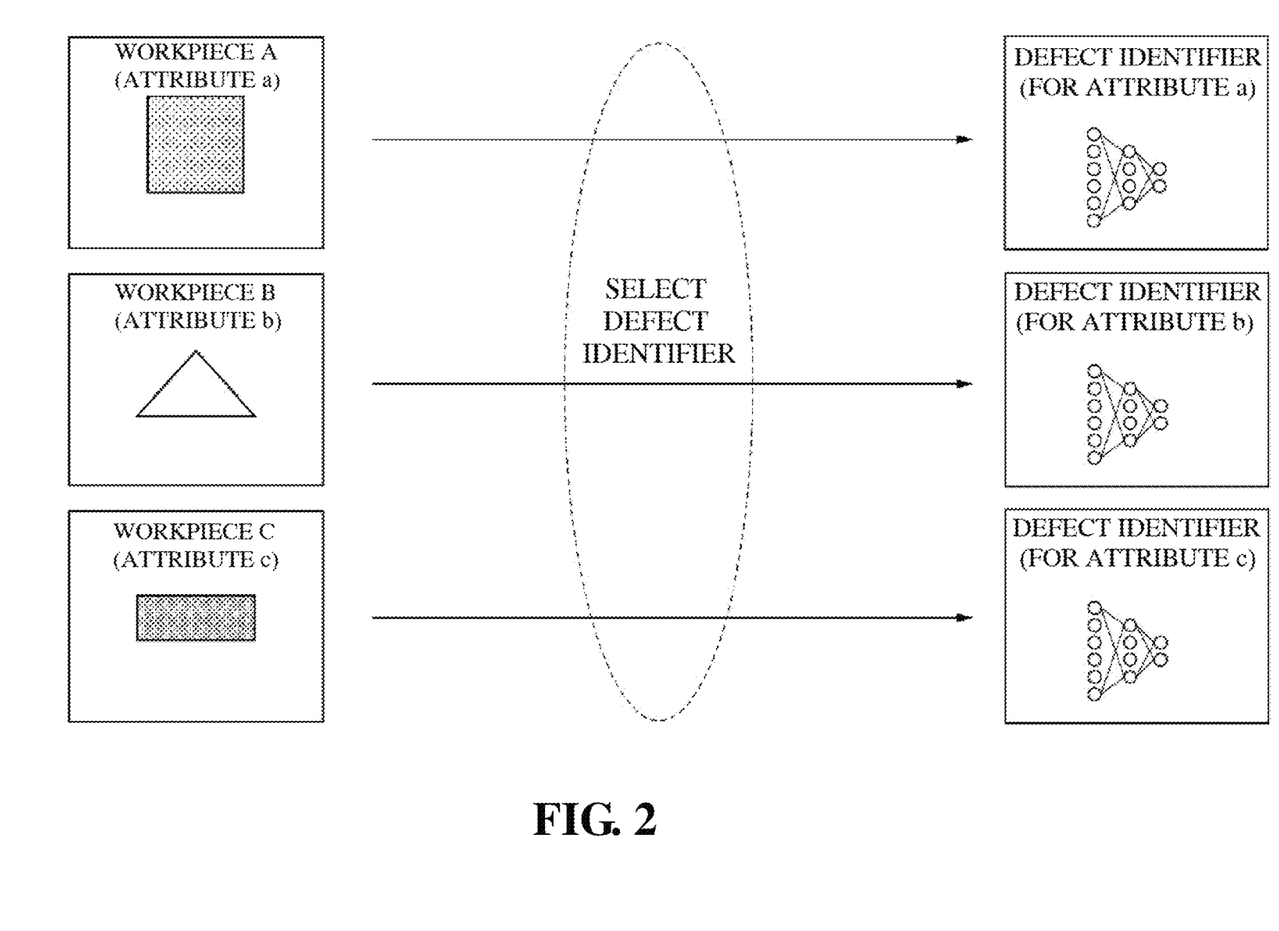
FIG. 2 is a diagram schematically illustrating an example of a defect identifier.

The image processing apparatus 200 includes multiple identifiers or identifying devices (hereinafter, referred to as "defect identifiers") that are trained to identify the presence or absence of a defect included in a workpiece, by receiving an image of the workpiece (an image in which the workpiece is captured). The multiple defect identifiers are identifiers that are trained such that each defect identifier exhibits high identification accuracy for a different attribute of a workpiece. In this manner, as shown in FIG. 2, for example, the entire image processing apparatus 200 can exhibit high identification accuracy while handling workpieces having various attributes, by an appropriate defect identifier being selected according to the attribute of the workpiece to be inspected. The defect identifier is an example of a "first identifier" of an embodiment.

In this example, a defect is an anomaly in the object to be inspected, such as a scratch, unevenness in the color or the like, contamination, a dent, a chip, burring, foreign matter, blurred printing, printing misalignment, or the like. An attribute of a workpiece is expressed by an appearance-related feature of the workpiece, and, more specifically, it may be defined by one appearance-related feature of the workpiece or a combination of multiple features. Furthermore, an appearance-related feature of a workpiece may be expressed by, for example, a combination of aspects related to properties of the workpiece such as "surface form", "reflectance", or "transparency", and aspects related to a level such as "low, medium, or high" or states such as "smooth", "rough", or "uneven". Specific examples of appearance-related features of a workpiece include "surface form is smooth", "reflectance is high", "transparency is low", and the like. Furthermore, specific examples of attributes of a workpiece include "appearance whose surface form is smooth, surface reflectance is high, and transparency is low", "appearance whose surface form is rough, surface reflectance is low, and transparency is low", and the like.

Firstly, the image processing apparatus 200 captures a workpiece passing through a production line or the like, and identifies an attribute of the workpiece based on the captured image of the workpiece. Here, the image processing apparatus 200 specifies the attribute of the workpiece by using an identifier (hereinafter, referred to as "attribute identifier") that is trained to specify the attribute of the workpiece by receiving the image of the workpiece. The attribute identifier may be an identifier that is generated by any apparatus. For example, the attribute identifier may be generated by the management apparatus 100 and be incorporated into the image processing apparatus 200. The attribute identifier is an example of a "second identifier" of an embodiment.

Next, the image processing apparatus 200 selects, from the multiple defect identifiers included in the image processing apparatus 200, a specific defect identifier corresponding to the attribute of the workpiece that is specified by the attribute identifier. Then, the image processing apparatus 200 identifies the presence or absence of a defect included in the workpiece by inputting the image of the workpiece into the selected defect identifier, and outputs an identification result.

As mentioned above, the multiple defect identifiers are identifiers that are trained such that each defect identifier exhibits high identification accuracy for a different attribute of a workpiece. Accordingly, the entire image processing apparatus 200 can exhibit high identification accuracy while handling workpieces having various attributes, by an appropriate defect identifier being selected according to the attribute of the workpiece. Also, the image processing apparatus 200 does not simultaneously execute the multiple defect identifiers included in the image processing apparatus 200, but operates the specific defect identifier in accordance with the workpiece passing through a production line. Accordingly, the processing load and the memory usage amount of the image processing apparatus 200 can be reduced.

2. Configuration Example

Hardware Configuration
Management Apparatus

Figure 3:
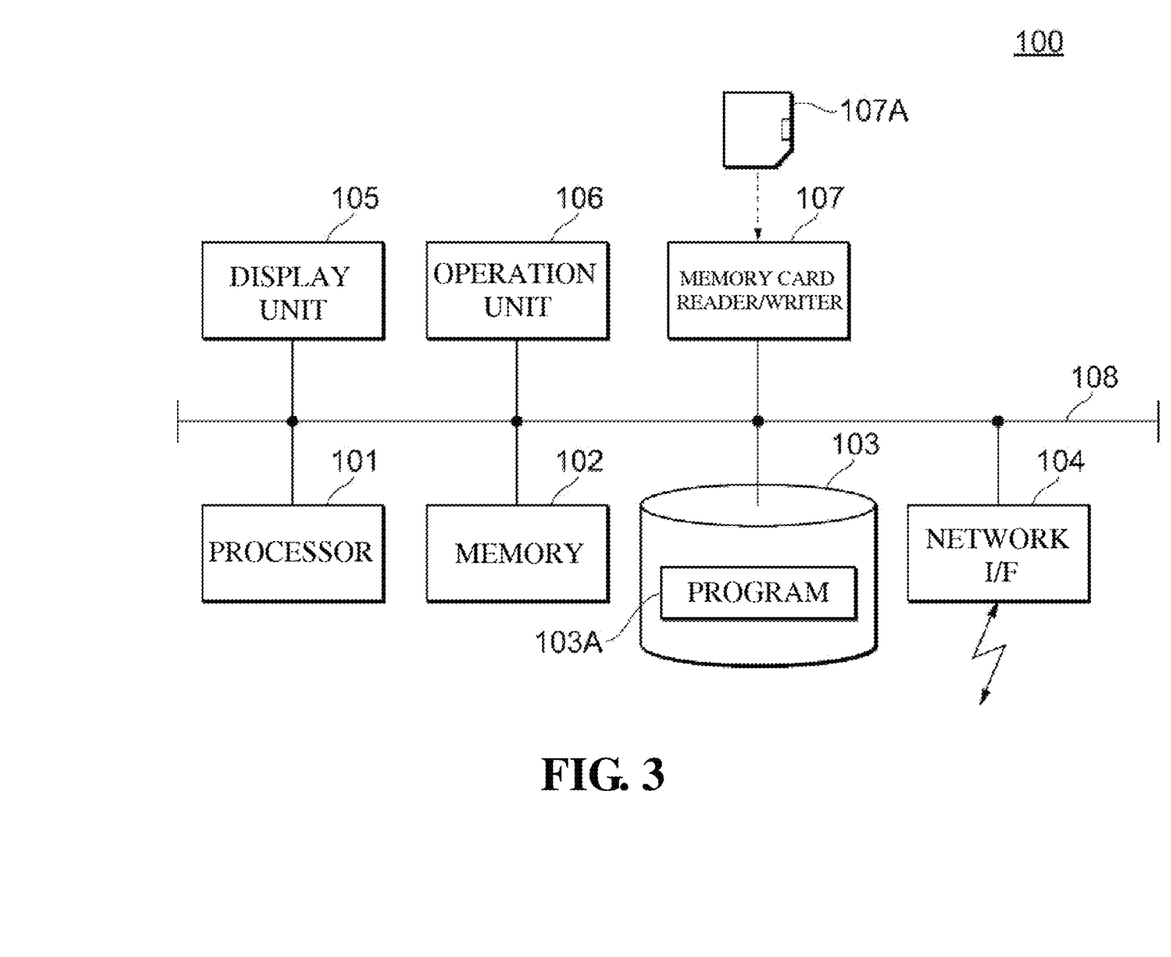
FIG. 3 is a diagram schematically illustrating an example of a hardware configuration of a management apparatus according to an embodiment.

Next, an example of the hardware configuration of the management apparatus 100 according to an embodiment will be described with reference to FIG. 3. FIG. 3 schematically shows an example of the hardware configuration of the management apparatus 100 according to an embodiment. In the example in FIG. 3, the management apparatus 100 may include a processor 101, a memory 102, a storage device 103 such as an HDD (Hard Disk Drive), a network interface (I/F) 104, a display unit 105, an operation unit 106, and a memory card reader/writer 107. These units are communicably connected to each other via an internal bus 108.

The processor 101 realizes various functions of the management apparatus 100, by expanding a program (command code) 103A stored in the storage device 103 into the memory 102, and executing the program. The memory 102 and the storage device 103 store data respectively in a volatile and non-volatile manner. The storage device 103 stores the program 103A in addition to an OS (Operating System).

The network interface 104 exchanges data with the image processing apparatus 200 via the network 2.

The display unit 105 displays various screens and the like realized by the processor 101 executing the program 103A. The display unit 105 is composed of, for example, a display screen such as an LCD (Liquid Crystal Display).

The operation unit 106 receives a user operation, and outputs an internal command indicating the received operation to the processor 101 or the like. The operation unit 106 is composed of, for example, a keyboard, a mouse, a touch panel, a tablet, a speech recognition unit, or the like.

The memory card reader/writer 107 reads data from a storage medium 107A, and writes data to the storage medium 107A. The storage medium 107A is a medium that stores information such as a program through electrical, magnetic, optical, mechanical, or chemical effects such that the stored information such as a program can be read by computers or other devices or machines. The management apparatus 100 may also acquire the program 103A from the storage medium 107A.

Image Processing Apparatus

Figure 4:
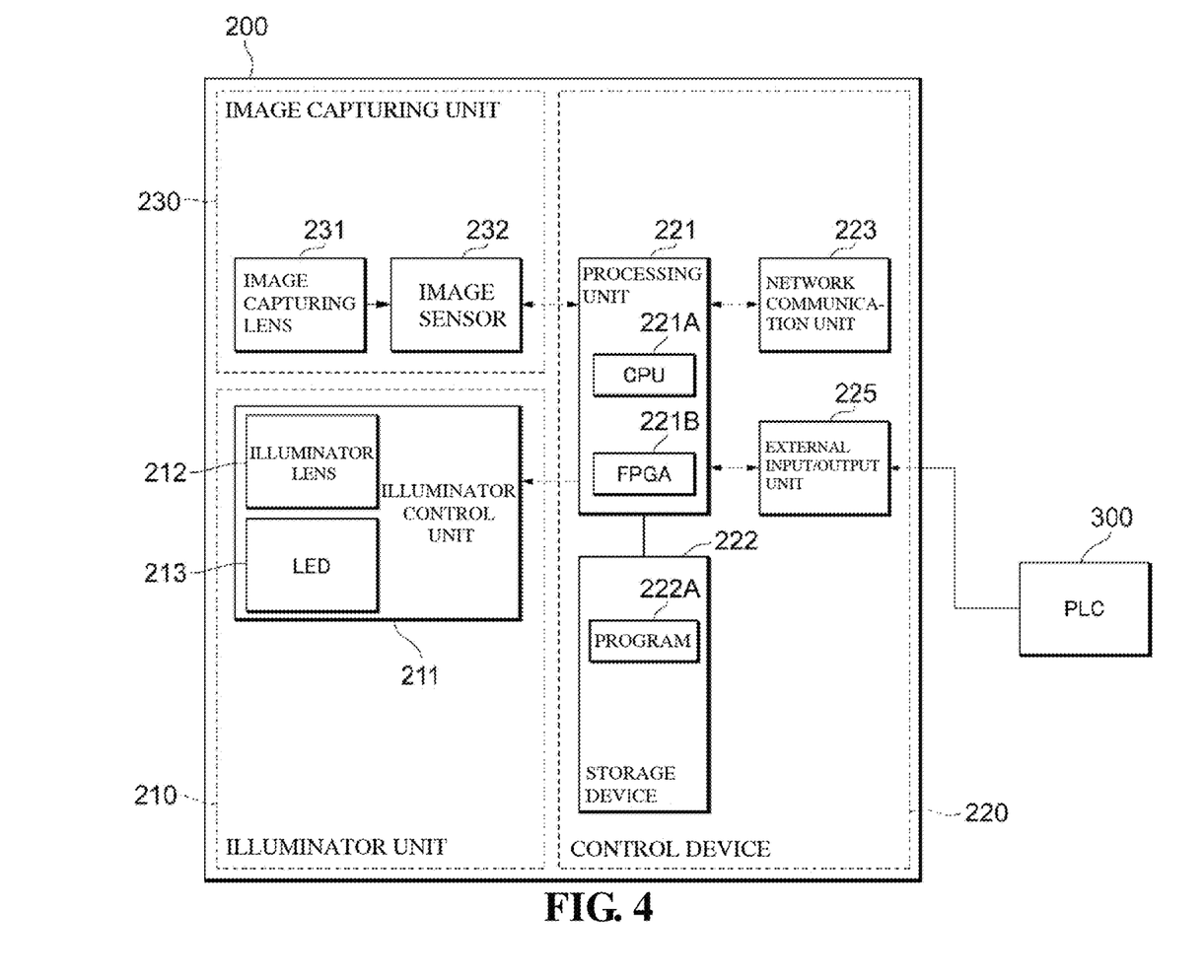
FIG. 4 is a diagram schematically illustrating an example of a hardware configuration of an image processing apparatus according to an embodiment.

Next, an example of the hardware configuration of the image processing apparatus 200 according to an embodiment will be described with reference to FIG. 4. FIG. 4 schematically shows an example of the hardware configuration of the image processing apparatus 200 according to an embodiment. In the example in FIG. 4, the image processing apparatus 200 may also include an illuminator unit 210, a control device 220, and an image capturing unit 230.

The illuminator unit 210 irradiates a workpiece that is an object to be inspected, with light necessary to capture the image. That is to say, the illuminator unit 210 irradiates an image capturing range of the image capturing unit 230 with light. More specifically, the illuminator unit 210 includes multiple illuminator control units 211 provided on an illuminator board. These units are arranged on the illuminator board. Each illuminator control unit 211 includes an illuminator lens 212 and an LED 213. The illuminator control unit 211 irradiates a workpiece with light in accordance with a command from the control device 220. More specifically, light generated by the LED 213 is emitted via the illuminator lens 212 onto the workpiece.

The image capturing unit 230 outputs an image signal upon receiving reflect light emitted from the illuminator unit 210. The image signal is transmitted to the control device 220. More specifically, the image capturing unit 230 includes an image sensor 232 partitioned into multiple pixels such as a CCD (Charge Coupled Device) or a CMOS (Complementary Metal Oxide Semiconductor) image sensor, in addition to an optical system such as an image capturing lens 231.

The control device 220 controls the entire image processing apparatus 200. That is to say, the control device 220 controls the illuminator unit 210 and the image capturing unit 230, and performs image processing based on the image signal from the image capturing unit 230. More specifically, the control device 220 includes a processing unit 221, a storage device 222, a network communication unit 223, and an external input/output unit 225.

The processing unit 221 is composed of an integrated circuit such as a CPU 221A or an FPGA 221B. Alternatively, the processing unit 221 may also be composed of a DSP, GPU, an ASIC (Application Specific Integrated Circuit), or other integrated circuits.

The storage device 222 includes a non-volatile storage device such as a ROM (Read Only Memory), a flash memory, an HDD, or an SSD (Solid State Drive), and/or a non-volatile memory such as a RAM (Random Access Memory). Typically, the processing unit 221 realizes various types of image processing of the image processing apparatus 200, by executing a program (command code) 222A stored in the storage device 222.

The network communication unit 223 is an interface for exchanging data with the management apparatus 100 via the network 2. More specifically, the network communication unit 223 uses a configuration compliant with the Ethernet (registered trademark) or the like. The external input/output unit 225 is an interface for exchanging various types of data (input and/or output data) with a PLC (Programmable Logic Controller) 300.

Functional Configuration

Management Apparatus

Figure 5:
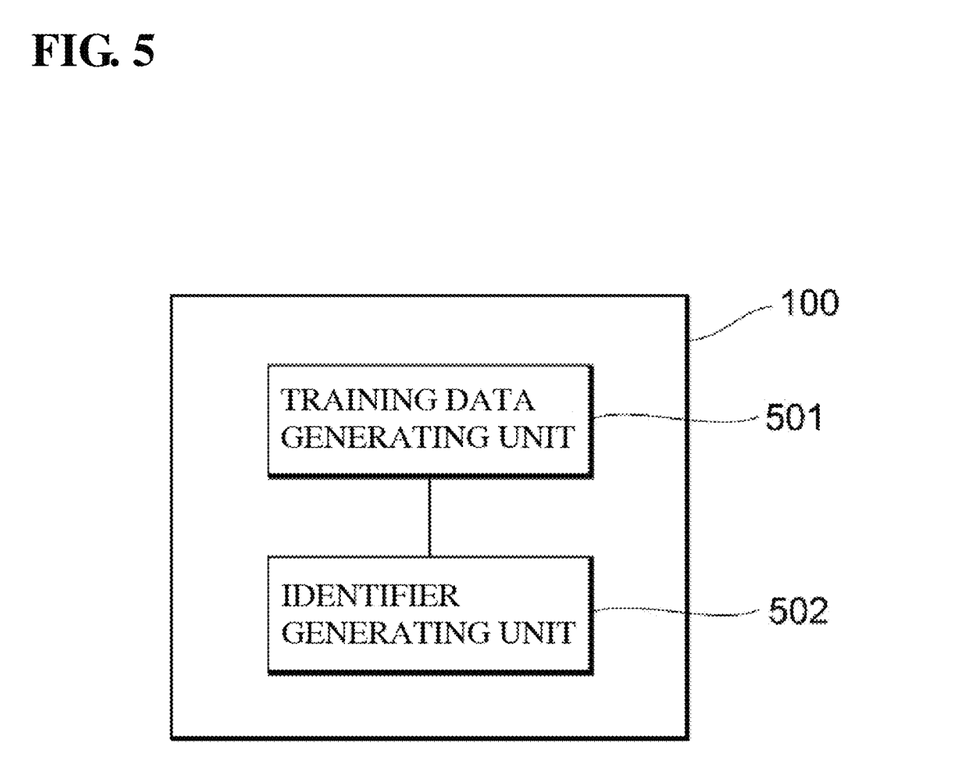
FIG. 5 is a diagram schematically illustrating an example of a functional configuration of a management apparatus according to an embodiment.

Next, an example of the functional configuration of the management apparatus 100 according to an embodiment will be described with reference to FIG. 5. FIG. 5 schematically shows an example of the functional configuration of the management apparatus 100 according to an embodiment.

A training data generating unit generates 501 training data for causing the attribute identifier to be trained. The training data includes an image of a workpiece for training, and a correct answer value of the attribute of the workpiece for the image of the workpiece for training or a correct answer value of a defect identifier to be selected. The training data generating unit 501 may also display the training data generating screen in the display unit 105. A user can generate training data by operating the screen.

Let us assume that, for example, a defect identifier corresponding to identification of a defect included in a workpiece whose surface is metal and a defect identifier corresponding to identification of a defect included in a workpiece whose surface is rough are incorporated in the image processing apparatus 200. In this case, a user imports multiple images of workpieces for training obtained by capturing workpieces whose surface is metal into the management apparatus 100. Then, the user may also generate training data by inputting, to the training data generating screen, "the attribute of the workpiece is that its surface is metal" or "a defect identifier to be selected is a defect identifier corresponding to identification of a defect included in a workpiece whose surface is metal", as the correct answer value for each image of the workpieces.

The identifier generating unit 502 generates, by using training data generated through the training data generating unit 501, an attribute identifier by performing training processing and evaluation processing on any machine learning model. A machine learning model is a model having a predetermined model structure and processing parameters that change in accordance with training processing, and improves the level of precision of a recognition result by optimizing the processing parameters based on experience obtained from training data. As an algorithm of the machine learning model, for example, support vector machines, logistic regression, neural networks, deep neural networks, or the like may be used, but there is no particular limitation to these. The identifier generating unit 502 may also incorporate the generated attribute identifier into the image processing apparatus 200, by transmitting the generated attribute identifier (specifically, the model structure and the processing parameters) to the image processing apparatus 200.

Image Processing Apparatus

Figure 6:
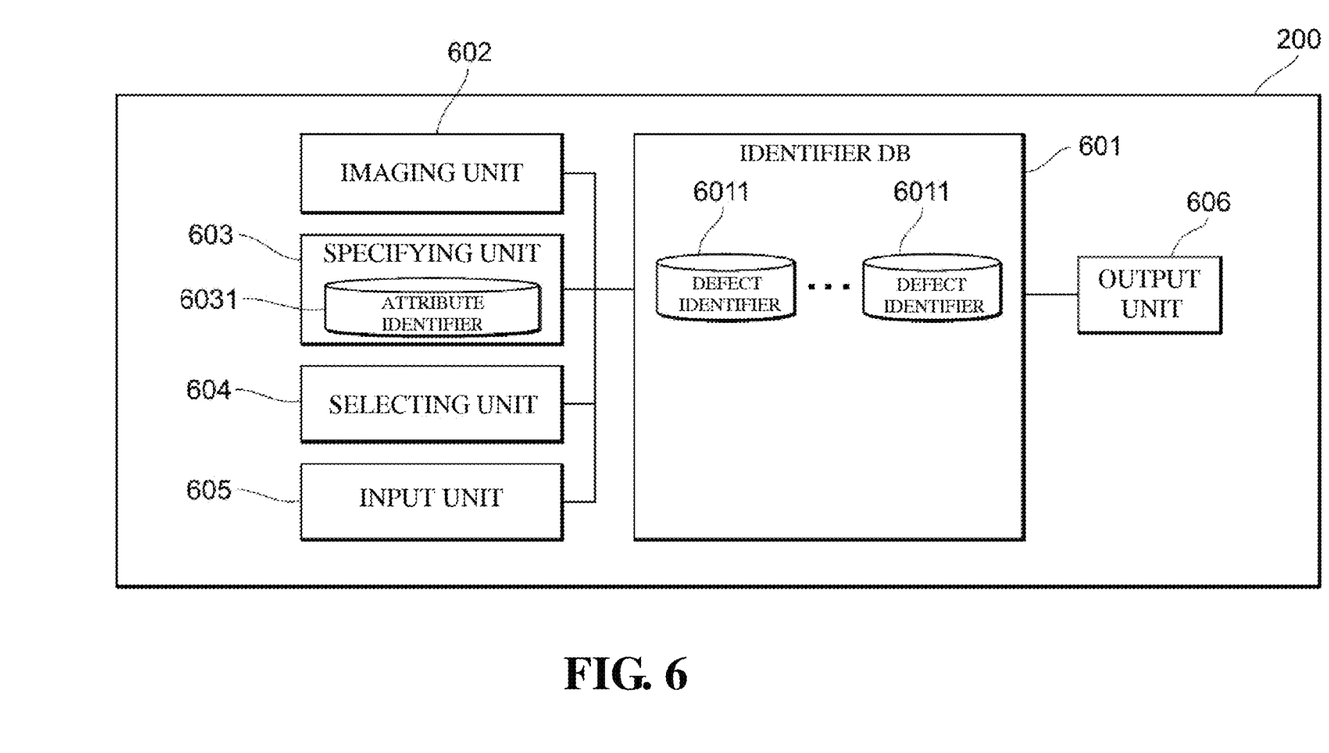
FIG. 6 is a diagram schematically illustrating an example of a functional configuration of an image processing apparatus according to an embodiment.

Next, an example of the functional configuration of the image processing apparatus 200 according to an embodiment will be described with reference to FIG. 6. FIG. 6 schematically shows an example of the functional configuration of the image processing apparatus 200 according to an embodiment.

An identifier DB (Data Base) 601 is a database for storing the multiple defect identifiers, and is stored in the storage device 222. In the example in FIG. 6, multiple defect identifiers 6011 are exemplified. The defect identifier 6011 is trained to identify, for an object having an attribute with which that defect identifier 6011 is associated, the presence or absence of a defect with higher accuracy than any other defect identifier.

The defect identifiers 6011 are generated by performing training processing and evaluation processing on any machine learning model. As an algorithm of the machine learning model, for example, support vector machines, logistic regression, neural networks, or the like may be used, but there is no particular limitation to these.

The imaging unit 602 controls the image capturing unit 230 and capture an image of a workpiece. Also, the imaging unit 602 provides the captured image of the workpiece to the specifying unit 603 or the input unit 605.

The specifying unit 603 specifies an attribute of the workpiece from the image of the workpiece captured by the imaging unit 602. The specifying unit 603 includes an attribute identifier 6031, and the attribute identifier 6031 specifies the attribute of the workpiece from the image of the workpiece. As an algorithm of the machine learning model used for the attribute identifier 6031, for example, support vector machines, logistic regression, neural networks, deep neural networks, or the like may be used, but there is no particular limitation to these.

The selecting unit 604 selects, from the multiple defect identifiers 6011, the defect identifier 6011 corresponding to the attribute of the workpiece that is specified by the specifying unit 603. The input unit 605 inputs, to the defect identifier 6011 that is selected by the selecting unit 604, the image of the workpiece captured by the imaging unit 602. The output unit 606 outputs an identification result regarding the presence or absence of a defect included in the workpiece, which is output from the defect identifier 6011.

Other Considerations

In an embodiment, an example has been described in which all functions of the image processing apparatus 200 are realized by the processing unit 221. However, some or all of the functions may also be realized by one or multiple dedicated processors or the like. Furthermore, the functions of the image processing apparatus 200 in each functional configuration may also be omitted, replaced, or added as appropriate according to an embodiment.

3. Operation Example

Next, an operation example of the image processing apparatus 200 will be described. In the following operation example, a description will be given assuming that the image processing system 1 is incorporated into a production line, and the image processing apparatus 200 specifies the presence or absence of a defect for a workpiece passing through the production line. Note, that the processing procedure described below is merely an example, and the individual processes may be changed to the extent possible. Furthermore, steps in the processing procedure described below may be omitted, replaced, or added as appropriate depending on an embodiment.

Processing Procedure

Figure 7:
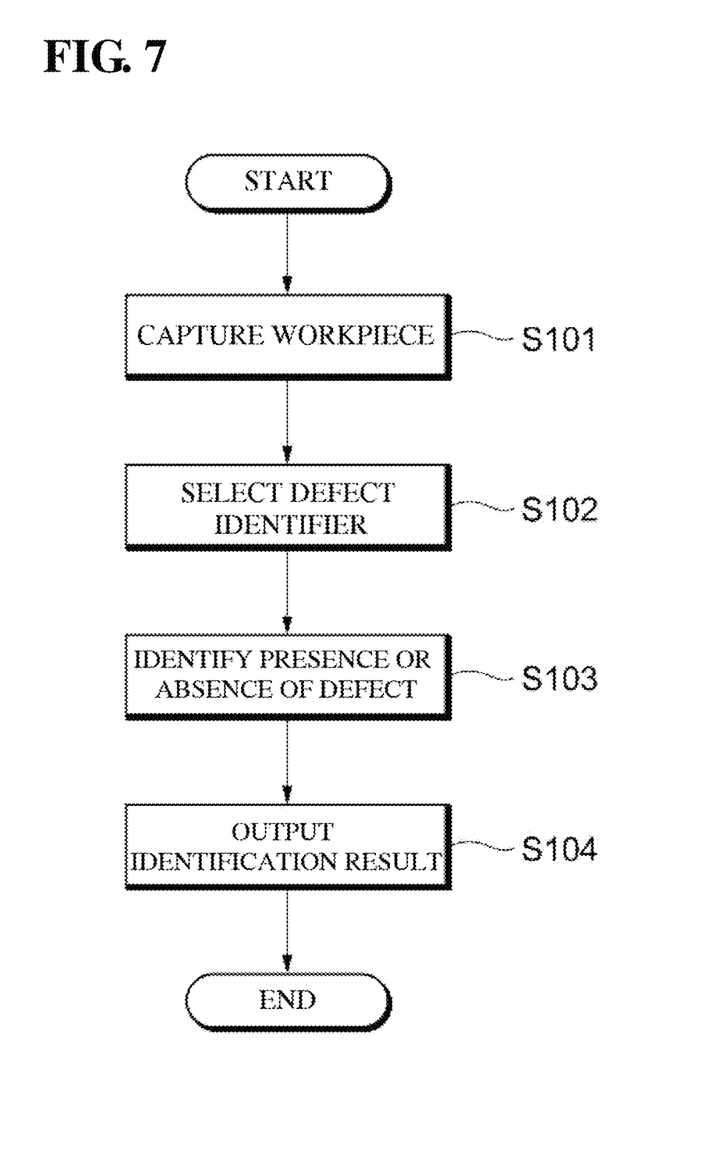
FIG. 7 is a diagram illustrating an example of processing procedure performed by an image processing apparatus.

FIG. 7 is a flowchart showing an example of the processing procedure performed by the image processing apparatus 200. First, the imaging unit 602 captures an image of a workpiece passing on a production line (S101). Next, the specifying unit 603 inputs the captured image of the workpiece into the attribute identifier 6031, and specifies an attribute of the workpiece by causing the attribute identifier 6031 to output the attribute of the workpiece. Then, the selecting unit 604 selects the defect identifier 6011 corresponding to the specified attribute of the workpiece (S102). After that, the input unit 605 inputs, to the selected defect identifier 6011, the image of the workpiece captured in the processing procedure of step S101. The defect identifier 6011 identifies whether the workpiece includes a defect (S103). Then, the output unit 606 outputs the identification result identified by the defect identifier 6011 to, for example, an external information processing apparatus connected to the image processing apparatus 200 or a display connected to the image processing apparatus 200 (S104).

The image processing apparatus 200 repeats the processing procedures from steps S101 to S104 each time a workpiece passes on the production line.

Figure 8:
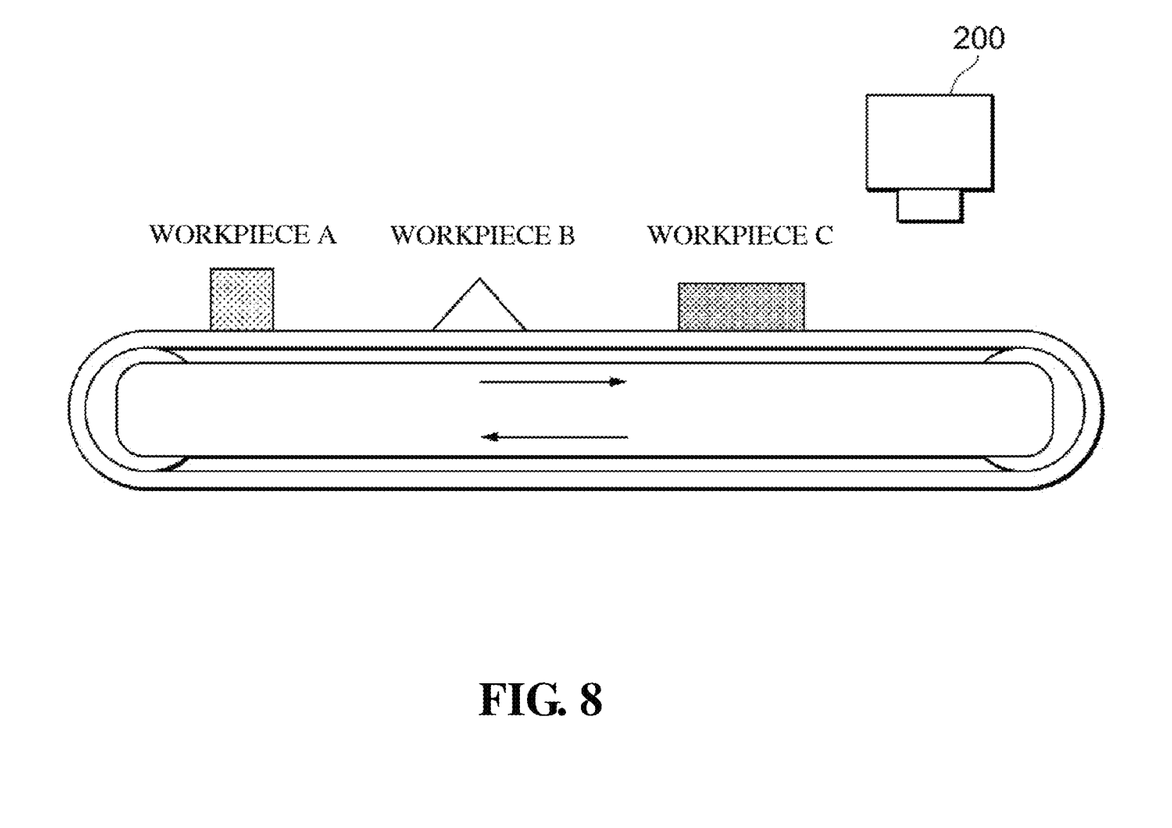
FIG. 8 is a diagram illustrating an example of a state in which an image processing apparatus inspects a workpiece on a production line.

FIG. 8 shows an example of a state in which the image processing apparatus 200 inspects a workpiece on a production line. Workpieces A, B, and C respectively have attributes a, b, and c. When the workpiece C passes on the belt conveyor, the imaging unit 602 captures the image of the workpiece C at the timing when the workpiece C comes under the image processing apparatus 200. Then, the image capturing unit 602 provides the captured image of the workpiece to the specifying unit 603. The specifying unit 603 specifies the attribute of the workpiece by using the attribute identifier 6031. The selecting unit 604 selects the defect identifier 601 corresponding to the specified attribute of the workpiece.

Figure 9:
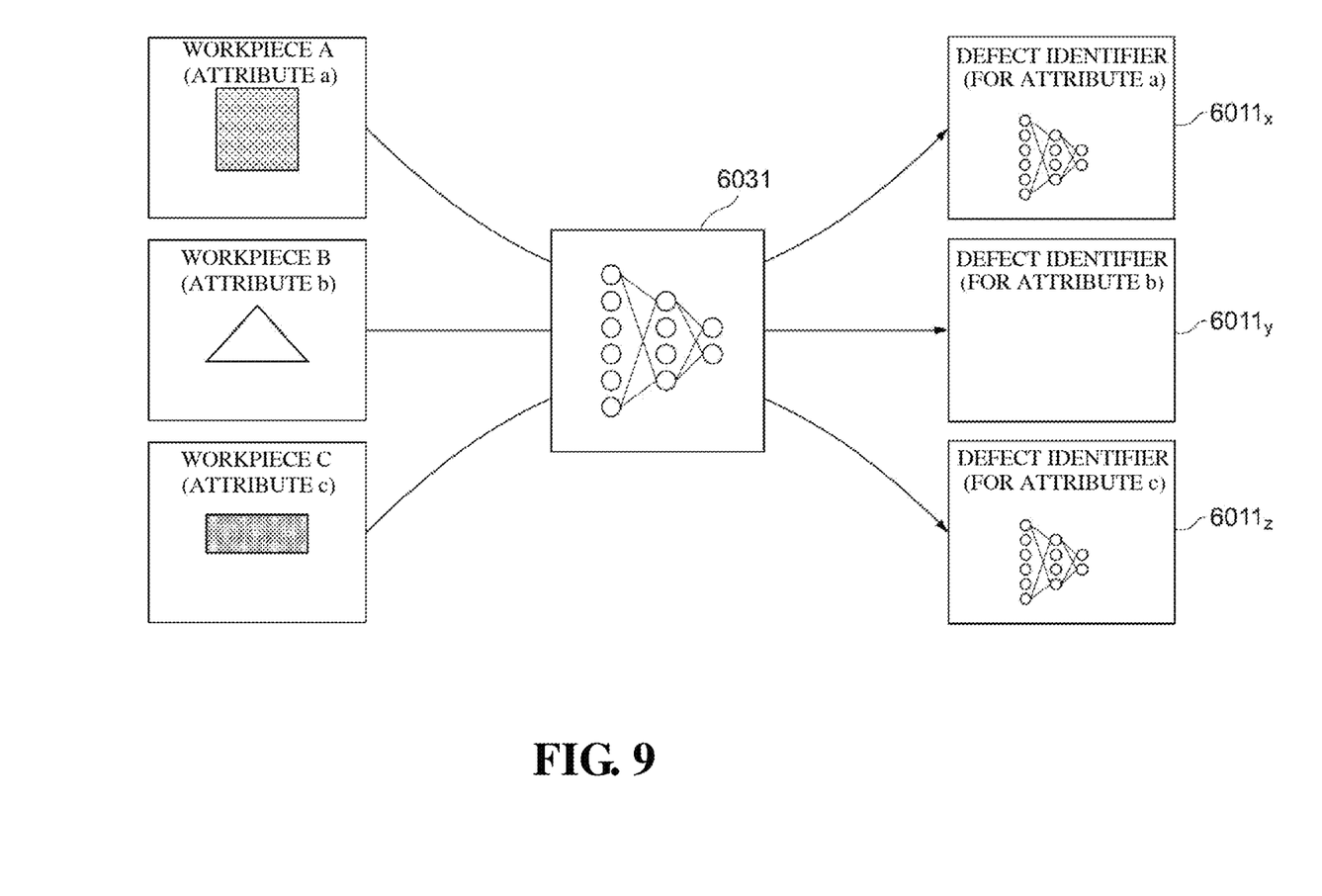
FIG. 9 is a diagram illustrating an example of an operation in which an attribute identifier selects a defect identifier.

FIG. 9 shows an example of an operation for selecting the defect identifier. Let us assume that, for example, the identifier DB 601 stores a defect identifier $6011_x$ corresponding to the attribute a, a defect identifier $6011_y$ corresponding to the attribute b, and a defect identifier $6011_z$ corresponding to the attribute c. If the attribute identifier 6031 receives the image of the workpiece A, the attribute identifier 6031 outputs the attribute a, which is the attribute of the workpiece A. Then, the selecting unit 604 selects the defect identifier $6011_x$ corresponding to the attribute a. Similarly, if the attribute identifier 6031 receives the image of the workpiece B and the image of the workpiece C, the attribute identifier 6031 respectively outputs the attribute b that is the attribute of the workpiece B and the attribute c that is the attribute of the workpiece C. After that, the selecting unit 604 selects the defect identifier $6011_y$ corresponding to the attribute b and the defect identifier $6011_z$ corresponding to the attribute c.

Figure 10:
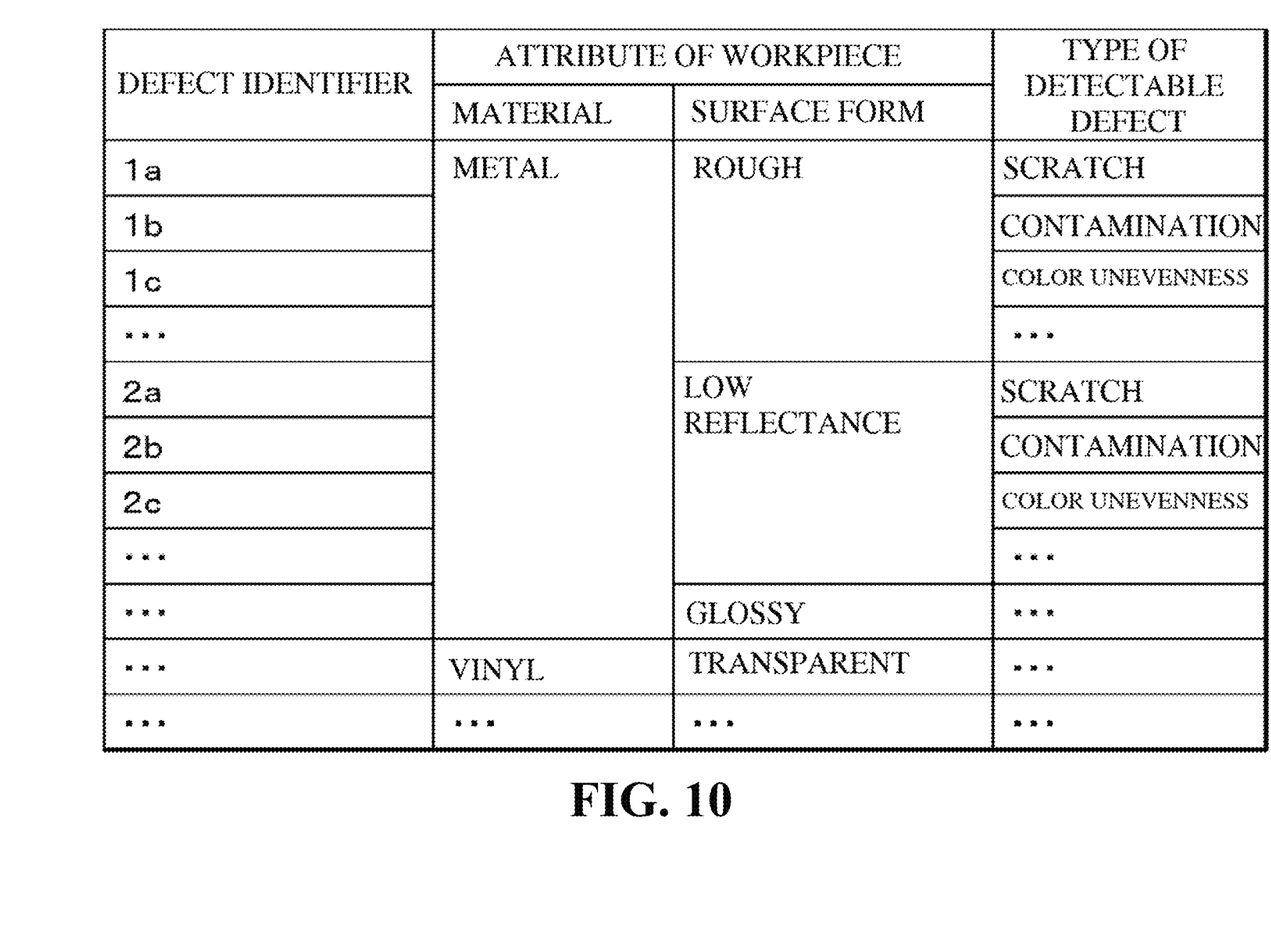
FIG. 10 is a diagram illustrating an example of a defect identifier that is classified by type of identifiable defect.

Here, to increase the identification accuracy, the defect identifiers 6011 may also be classified by type of detectable defects. FIG. 10 shows an example of defect identifiers that are classified by type of identifiable defects. Defect identifiers $6011_{1a}$, and $6011_{2a}$ are, for example, defect identifiers 6011 that detect defects and are specialized in scratches. The defect identifiers $6011_{1b}$ and $6011_{2b}$ are the defect identifiers 6011 that detect defects and are specialized in contamination. The defect identifiers $6011_{1c}$ and $6011_{2c}$ are the defect identifiers 6011 that detect defects and are specialized in unevenness in the color. Note, that the types of detectable defects may also be classified in more detail. If the defect is a scratch, the defect may also be classified in more detail based on the depth and length of the scratch, such as scratches having a depth of 100 μm or less and scratches having a depth of 100 μm or more. The defect identifier 6011 may also be able to detect defects and be specialized in scratches that are classified in such detail.

In this case, the selecting unit 604 may select, from the identifier DB 601, the defect identifiers 6011 that can detect the type of defect designated by a user, or may also select, from the selected multiple defect identifiers 6011, the defect identifier 6011 corresponding to the attribute of the workpiece that is specified by the specifying unit 603. If the user designates "scratch" as the type of the defect, for example, the selecting unit 604 selects, from the defect identifiers 6011 ($6011_{1a}$ or $6011_{2a}$) that can detect scratches, the defect identifier 6011 corresponding to the attribute of the workpiece. If the attributes of the workpiece are "material is metal" and "surface form is low reflectivity", the selecting unit 604 selects the defect identifier $6011_{2a}$.

By installing multiple image processing apparatuses 200 in the image processing system 1 and designating a different type of defect for each image processing apparatus 200, the user can, for example, cause the three image processing apparatuses 200 installed in a production line to identify the presence or absence of a scratch, the presence or absence of contamination, the presence or absence of a dent or the like respectively. As mentioned above, an image processing system 1 having higher identification accuracy can be constructed, by using multiple image processing apparatuses 200.

Figure 11:
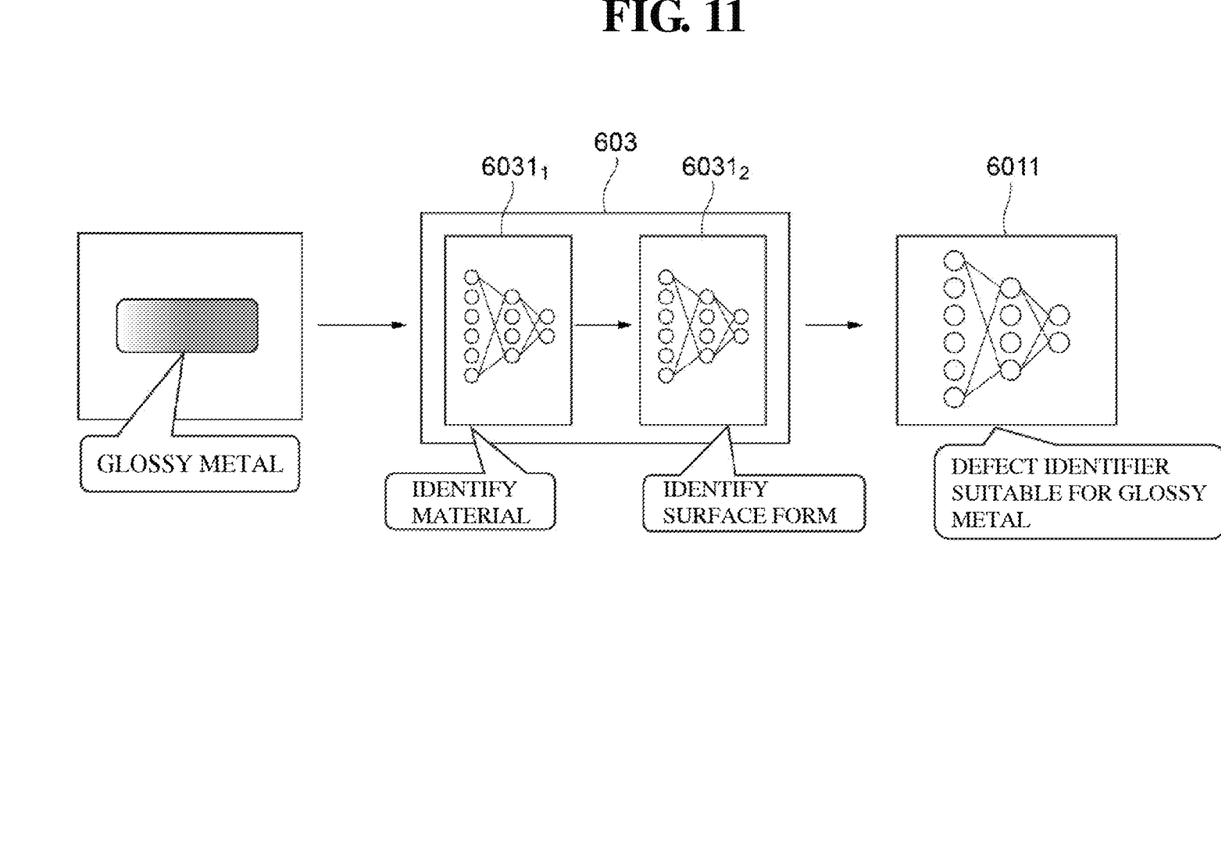
FIG. 11 is a diagram illustrating an example of an operation in which an attribute of a workpiece is identified using multiple attribute identifiers.

Also, the specifying unit 603 may also be constituted by multiple attribute identifiers 6031 each having the ability of identifying a specific attribute of a workpiece. FIG. 11 shows an example of an operation in which an attribute of a workpiece is identified using multiple attribute identifiers 6031. In the example in FIG. 11, the specifying unit 603 includes an attribute identifier $6031_1$ that has the ability of identifying "material of the workpiece", which is a portion of the attribute of a workpiece, and an attribute identifier $6031_2$ that has the ability of identifying "surface form of the workpiece", which is a portion of the attribute of a workpiece. At first, the specifying unit 603 specifies, by inputting an image of a workpiece to the attribute identifier $6031_1$, the material of the workpiece. Next, the specifying unit 603 specifies the surface form of the workpiece by inputting the image of the workpiece to the attribute identifier $6031_2$. Note, that not being limited to the example of FIG. 11, the attribute identifiers $6031_1$ and $6031_2$ may also identify the attributes of the workpiece simultaneously (in parallel). In the example in FIG. 11, the specifying unit 603 specifies "glossy metal" as the attribute of a workpiece, and thus the selecting unit 604 selects the defect identifier 6011 suitable for identifying glossy metal. Note, that not being limited to the example of FIG. 11, the specifying unit 603 may also be constituted by three or more attribute identifiers 6031.

4. Modifications

Modification 1

Let us consider the case that, in a production line, the order of workpieces passing on a belt conveyor is previously determined such that they pass repeatedly in the order of a workpiece A (an attribute a), a workpiece B (an attribute b), and a workpiece C (an attribute c). In this case, the order of the images of the workpieces that are input from the input unit 605 to the defect identifiers 6011 is always in the order of workpiece A, workpiece B, and workpiece C. Accordingly, the selecting unit 604 may repeatedly select the defect identifier 6011 in the order of defect identifier 6011 corresponding to the attribute a, defect identifier 6011 corresponding to the attribute b, and defect identifier 6011 corresponding to the attribute c.

To realize this operation, "order information", which shows the order of the attributes of the workpieces corresponding to the arrangement order in which the workpieces passing on the production line are arranged (that is, the arrangement order of the workpieces whose presence or absence of a defect is to be detected by the image processing apparatus 200), is stored in the storage device 222. Then, the selecting unit 604 may also select the defect identifier 6011 in accordance with the order of the attributes of the workpieces shown by the order information. In this manner, the operation of the selecting unit 604 can be simplified, and the processing load and the memory usage amount of the image processing apparatus 200 can be reduced.

Although an embodiment has been described above in detail, the aforementioned description is, in all respects, merely illustrative of the invention. Needless to say, various improvements and modifications can be made without departing from the scope of the invention.

Additional Remark 1

An identifying apparatus (200) comprising:
a storage unit (601) configured to store multiple identifiers (6011) that are trained to identify, from images of objects, the presence or absence of a detection target included in the objects, the identifiers being stored in association with attributes of the objects;
an imaging unit (602) configured to capture an image of a predetermined object;
a specifying unit (603) configured to specify an attribute of the predetermined object;
a selecting unit (604) configured to select, from the multiple identifiers, a first identifier (6011) that is stored in association with the specified attribute;
an input unit (605) configured to input the image of the predetermined object to the first identifier (6011); and
an output unit (606) configured to output the presence or absence of the detection target included in the predetermined object, which is output from the first identifier (6011).

Additional Remark 2

The identifying apparatus (200) according to Additional Remark 1, wherein
the specifying unit (603) specifies the attribute of the predetermined object from the image of the predetermined object.

Additional Remark 3

The identifying apparatus (200) according to Additional Remark 2, wherein
the specifying unit (603) includes a second identifier (6031) that is trained to specify, from an image of an object, an attribute of the object, and the second identifier (6031) specifies the attribute of the predetermined object from the image of the predetermined object.

Additional Remark 4

The identifying apparatus (200) according to Additional Remark 1, wherein
the specifying unit (603) is configured to specify the attribute of the predetermined object in a preset order.

Additional Remark 5

The identifying apparatus (200) according to any one of Additional Remarks 1 to 4, wherein
multiple identifiers (6011) stored in the storage unit are each trained to specify, for an object having an attribute associated with the identifier (6011), the presence or absence of a detection target with higher accuracy than any other identifier.

Additional Remark 6

The identifying apparatus (200) according to any one of Additional Remarks 1 to 5, wherein
the object is an object to be inspected, and
the detection target is a defect included in the object to be inspected.

Additional Remark 7

An identifying method executed by an identifying apparatus (200) including a storage unit (601), the storage unit (601) storing multiple identifiers (6011) that are trained to specify, from images of objects, the presence or absence of a detection target included in the objects, the identifiers being stored in association with attributes of the objects, the method comprising:
a step of capturing an image of a predetermined object;
a step of specifying an attribute of the predetermined object;
a step of selecting, from the multiple identifiers (6011), a first identifier (6011) that is stored in association with the specified attribute;
a step of inputting the image of the predetermined object to the first identifier (6011); and
a step of outputting the presence or absence of a detection target included in the predetermined object, which is output from the first identifier (6011).

Additional Remark 8

A program for causing an identifying apparatus (200) to function as:
a storage part (601) configured to store multiple identifiers (6011) that are trained to identify, from images of objects, the presence or absence of a detection target included in the objects, the identifiers being stored in association with attributes of the objects;
an imaging part (602) configured to capture an image of a predetermined object;
a specifying part (603) configured to specify an attribute of the predetermined object;
a selecting part configured to select, from the multiple identifiers (6011), a first identifier (6011) that is stored in association with the specified attribute;
an input part (605) configured to input the image of the predetermined object to the first identifier (6011); and
an output part (606) configured to output the presence or absence of the detection target included in the predetermined object, which is output from the first identifier (6011).

The invention claimed is:

1. An identifying apparatus comprising:
a memory configured to store multiple identifiers that are trained to identify, from images of objects, a presence or absence of defects included in the objects, the identifiers being stored in association with attributes of the objects;
a camera configured to capture an image of an object to be inspected; and
a processor configured with a program to perform operations comprising:
operation as a specifying unit configured to specify an attribute of the object to be inspected, the attribute comprising an appearance-related feature of the object to be inspected, the appearance-related feature being associated with the presence or absence of a defect included in the object to be inspected;
operation as a selecting unit configured to select, from the multiple identifiers, a first identifier stored in association with the specified attribute and configured to identify the presence or absence of the defect associated with the specified attribute;

operation as an input unit configured to input the image of the object to be inspected to the first identifier; and operation as an output unit configured to output the presence or absence of the defect included in the object to be inspected, which is output from the first identifier.

2. The identifying apparatus according to claim 1, wherein
the processor is configured with the program such that operation as the specifying unit comprises specifying the attribute of the object to be inspected from the image of the object to be inspected.

3. The identifying apparatus according to claim 2, wherein
the memory is configured to store, among the multiple identifiers, a second identifier trained to specify, from the image of the object to be inspected, the attribute of the object to be inspected, and
the processor is configured with the program such that operation as the specifying unit comprises specifying the attribute of the object to be inspected based on the second identifier.

4. The identifying apparatus according to claim 1, wherein
the processor is configured with the program such that operation as the specifying unit comprises specifying attributes of a plurality of the objects to be inspected in a preset order.

5. The identifying apparatus according to claim 1, wherein
the multiple identifiers stored in the memory are each trained to specify, for an object having an attribute associated with that identifier, the presence or absence of a defect included in the object to be inspected with higher accuracy than any other identifier.

6. The identifying apparatus according to claim 2, wherein
the multiple identifiers stored in the memory are each trained to specify, for an object having an attribute associated with that identifier, the presence or absence of a defect included in the object to be inspected with higher accuracy than any other identifier.

7. The identifying apparatus according to claim 3, wherein
the multiple identifiers stored in the memory are each trained to specify, for an object having an attribute associated with that identifier, the presence or absence of a defect included in the object to be inspected with higher accuracy than any other identifier.

8. The identifying apparatus according to claim 4, wherein
the multiple identifiers stored in the memory are each trained to specify, for an object having an attribute associated with that identifier, the presence or absence of a defect included in the object to be inspected with higher accuracy than any other identifier.

9. An identifying method executed by an identifying apparatus including a storage unit, the storage unit storing multiple identifiers that are trained to specify, from images of objects, the presence or absence of defects a included in the objects, the identifiers being stored in association with attributes of the objects, the method comprising:

capturing an image of an object to be inspected;

specifying an attribute of the object to be inspected, the attribute comprising an appearance-related feature of the object to be inspected, the appearance-related feature being associated with the presence or absence of the detection target in the object to be inspected;

selecting, from the multiple identifiers, a first identifier stored in association with the specified attribute and configured to identify the presence or absence of the defect associated with the specified attribute;

inputting the image of the object to be inspected to the first identifier;

determining, via the first identifier, the presence or absence of the defect included in the object to be inspected, associated with the specified attribute; and outputting the presence or absence of the defect included in the object to be inspected, which is output from the first identifier.

10. The identifying method according to claim 9, wherein specifying the attribute of the object to be inspected comprises specifying the attribute of the object to be inspected from the image of the object to be inspected.

11. The identifying method according to claim 9, wherein specifying the attribute of the object to be inspected comprises specifying attributes of a plurality of the objects to be inspected in a preset order.

12. The identifying method according to claim 9, wherein the multiple identifiers stored in the memory are each trained to specify, for an object having an attribute associated with that identifier, the presence or absence of a defect included in the object to be inspected with higher accuracy than any other identifier.

13. A non-transitory computer-readable storage medium storing a program, which, when read and executed, causes a processor of an identifying apparatus to perform operations comprising:

storing, in a memory, multiple identifiers that are trained to identify, from images of objects, the presence or absence of defects included in the objects, the identifiers being stored in association with attributes of the objects;

capturing, by a camera, an image of an object to be inspected;

specifying, by the processor, an attribute of the object to be inspected, the attribute comprising an appearance-related feature of the object to be inspected, the appearance-related feature being associated with the presence or absence of the detection target in the object to be inspected;

selecting, by the processor, from the multiple identifiers, a first identifier stored in association with the specified attribute and configured to identify the presence or absence of the defect associated with the specified attribute;

inputting, by the processor, the image of the object to be inspected to the first identifier;

determining, via the first identifier, the presence or absence of the defect included in the object to be inspected, associated with the specified attribute; and outputting, by the processor, the presence or absence of the defect included in the object to be inspected, which is output from the first identifier.

* * * * *